July 14, 1953   J. A. DORNER   2,645,004
METHOD OF AND APPARATUS FOR ASSEMBLING
FLEXIBLE TUBING UPON MANDRELS
Filed Jan. 27, 1948
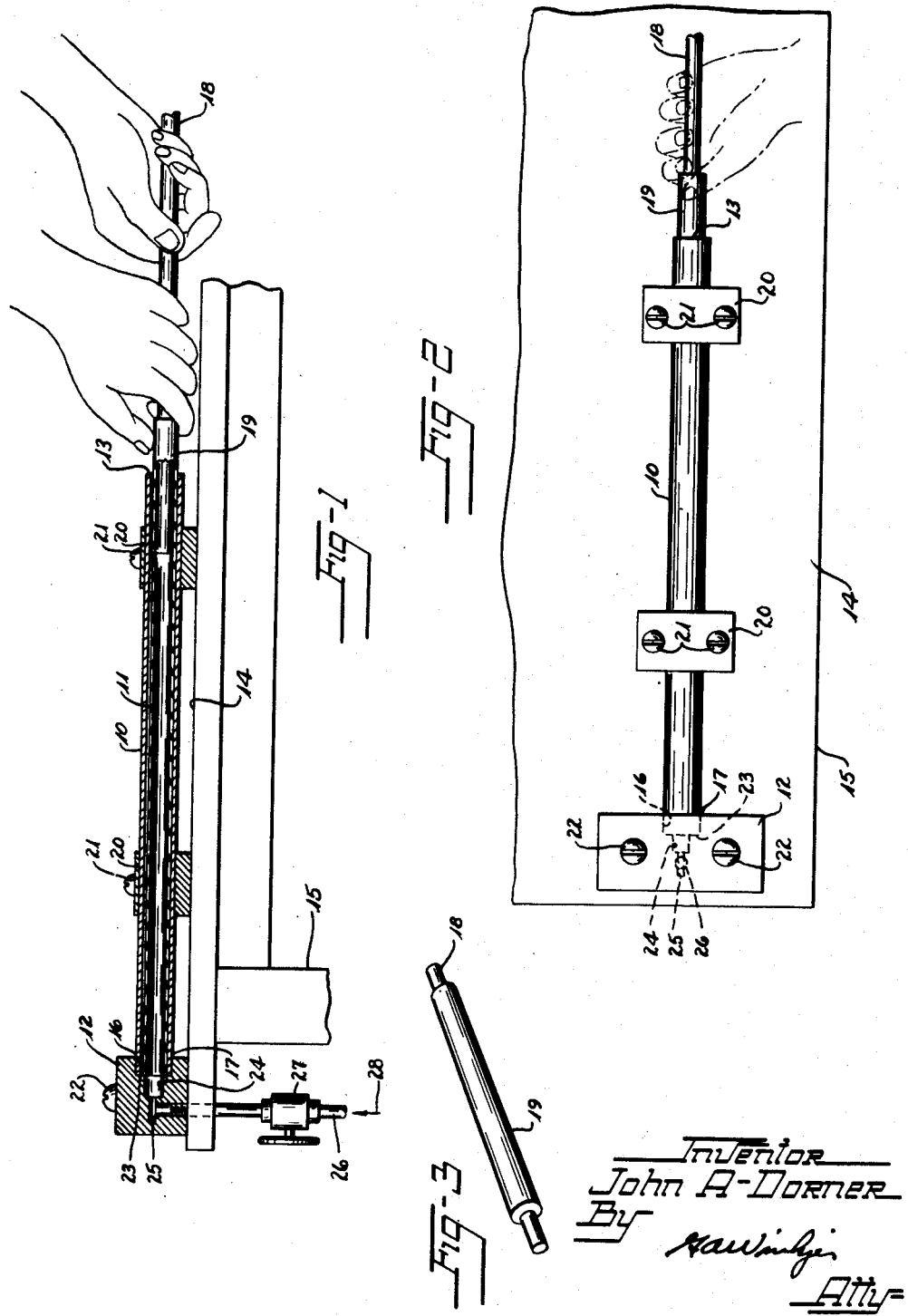
Inventor
John A. Dorner
By
Atty Patented July 14, 1953

2,645,004

UNITED STATES PATENT OFFICE 2,645,004

METHOD OF AND APPARATUS FOR ASSEMBLING FLEXIBLE TUBING UPON MANDRELS

John A. Dorner, Akron, Ohio, assignor to The B. F. Goodrich Company, New York, N. Y., a corporation of New York Application January 27, 1948, Serial No. 4,493

5 Claims. (Cl. 29—148)

1

The invention relates to methods of and apparatus for assembling flexible tubing upon mandrels and is useful, especially, with respect to pieces of hose, tubing of small diameter, and other elongated hollow bodies of elastic rubber, natural or synthetic, or other rubber-like material.

In applying pieces of rubber tubing in the uncured or partially cured condition upon suitable mandrels difficulties are encountered; inasmuch as the tubing tends to flex and buckle during the inserting operation, thereby slowing down the assembling of the tubing upon the mandrel. Also, the diameter of the mandrel employed is generally greater than the internal diameter of the uncured tubing; consequently the tubing is distended by and frictionally resists the insertion of the mandrel, thereby tending to further slow down the assembling operation. For these and other reasons, the problem is presented in commercial production of assembling the tubing upon the mandrel without incurring objectionable damage to and loss of the semi-finished tubing and without incurring an objectionably high production cost.

An object of the invention is to provide for overcoming these and other difficulties of assembling pieces of flexible tubing upon mandrels.

Other objects of the invention are to provide an improved method of and apparatus for assembling tubing of flexible material upon mandrels; to provide for reducing the frictional resistance to the insertion of the mandrel in the tubing; to provide for preventing damage of the tubing during the insertion of the mandrel; to provide for ejecting the assembled tubing and mandrel from the apparatus; and to provide simplicity of construction and for convenience of assembly, effectiveness of operation, and reduced cost of assembling pieces of flexible tubing upon mandrels.

These and other objects of the invention will be apparent from the following description.

In the accompanying drawings, which form a part of this specification, and in which like numerals are employed to designate like parts throughout the same, Fig. 1 is a side elevation of apparatus having therein a piece of flexible tubing in partially assembled relation to a mandrel, and constructed in accordance with and embodying the invention, parts being broken away, Fig. 2 is a plan view from above of the apparatus shown in Fig. 1, and Fig. 3 is a perspective view of the tubing and mandrel in assembled relation after ejection from the apparatus.

In the illustrative embodiment shown in the drawings, a supporting structure, which may be mounted on the top 14 of a table 15 as by adjustable mounting blocks 20, 20 and screws 21, 21 and 22, 22, includes a tubular member 10 of suitable metal and of the desired length detachably united at its end at 17 with a closure element 12 of suitable metal in a substantially airtight manner as by a press fit with the wall of an aperture 16 of the element 12. The tubular member 10 has a passage or bore 11 of uniform diameter therein for receiving a piece of flexible tubing 19 of elastic rubber, natural or synthetic, or other rubber-like material in the uncured or partially cured condition, which bore diameter is slightly greater than the outer diameter of the tubing 19 for the undistended condition of the latter to facilitate the entry of the tubing.

The tubular member 10 is desirably coextensive with the major portion of the length of the piece of tubing 19 so that a short portion of the tubing, sufficient for holding purposes, projects beyond the open end at 13 of the member, which latter, in addition to providing backing support of the tubing, maintains adjacent portions of the tubing in axial alignment, thereby facilitating the insertion of the mandrel with little or no hazard of injuring the tubing.

The closure element 12 presents a seating face 23 constituted by an annular shoulder extending laterally of the bore 11 as shown especially in Fig. 1, for contacting an end of the piece of flexible tubing 19, and for the construction shown, the seating face is provided by the inner end face of the aperture 16 which is counterbored to provide a central recess portion 24 for receiving and engaging an end of the mandrel 18 after the latter has passed beyond the end of the tubing 19. The closure element 12 has a conduit 25 in communication with the bore 11, preferably at the recess portion 24 of the seating face 23, for providing flow of air to the member 10, which conduit 25 is connected to a suitable source of air under pressure (not shown) by a pipe 26 and valve 27 structure. The air flows in the direction indicated by the arrow at 28 toward the end at 13. The construction of the supporting structure or apparatus advantageously facilitates the provision of closure elements and tubular members of different size to accommodate assembling different sizes of mandrels and pieces of flexible tubing.

In the use of the apparatus, the piece of flexible tubing 19 is introduced manually in the bore of the member 10 at its open end at 13 such that the major portion of the length of the tubing is enclosed and backed by the member 10, whereby one end of the tubing 19 is seated firmly against the seating face 23 while the other end projects somewhat beyond the end at 13 of the member 10. Flow of air under pressure is provided through the bore 11, preferably before the introduction of the tubing 19, in the direction away from the seating face toward the open end at 13. With the projecting end portion of the tubing held against axial movement and the other end of the tubing seated against the seating face, flow of air occurs through the passage of tubing.

The mandrel 18 is then introduced, desirably manually, into the projecting end portion of the tubing 19 as shown especially in Fig. 1. Upon such introduction, the flow of air in the passage is obstructed partially which effects distention of the tubing facilitating progressive movement of the mandrel until the latter seats in the recess portion 24 of the element 12. The tubular member 10 prevents effectively misalignment and localized distention of portions of the tubing whereby blowouts, punctures or other damage to the tubing is avoided during the insertion of the mandrel. The projecting end portion of the tubing is held continuously while the mandrel is being inserted in the tubing. When the tubing and mandrel are in assembled relation within the tubular member, such assembly is released whereupon the ejection from the apparatus is then effected by the piston-like action of the end of the assembly under the influence of the flow of air.

Variations may be made without departing from the scope of the invention as it is defined in the following claims.

I claim:

1. The method of assembling flexible tubing upon a mandrel, which method comprises the steps of providing flow of air through the bore of an elongate tubular member having a laterally disposed annular seating face in said bore at an end of said member by supplying air under pressure at a point within the confines of said seating face, introducing a piece of flexible tubing of extensible material endwise into the interior of said bore to a position against said seating face in sealing relation therewith with the wall of the tubing extending away from said seating face axially along and closely adjacent the internal wall of said member in said bore thereof so as to be restrained by said internal wall against rupture while flow of air is confined internally of the tubing, holding said piece of flexible tubing in said bore and pressing the tubing endwise against said seating face to confine the flow of air internally of the tubing and to prevent axial movement of the tubing in the direction of said flow of air and away from said seating face while the air is flowing through the tubing, inserting a mandrel into said piece of flexible tubing to a position at said seating face while the tubing is thus restrained against rupture and thus held in said position and pressed against said seating face and while the air is flowing through the interior of the tubing, and releasing the assembled tubing and mandrel while the same is in said bore and thereby effecting ejection of the tubing and mandrel assembly from said bore by the flow of air.

2. The method of assembling flexible tubing upon a mandrel, which method comprises the steps of providing flow of air through the bore of an elongate tubular member having a laterally disposed annular sealing face in said bore at an end of said member by supplying air under pressure at a point within the confines of said seating face, introducing the major portion of the length of a piece of flexible tubing of extensible material end first into the interior of said bore to a position against said seating face in sealing relation therewith with the wall of the tubing extending away from said seating face axially along and closely adjacent the internal wall of said member in said bore thereof so as to be restrained by said internal wall against rupture and with a portion of the flexible tubing projecting axially beyond the other end of said member while flow of air is confined internally of the tubing, manually holding the projecting portion of said piece of flexible tubing to retain said major portion thereof in said bore and manually pressing the tubing endwise against said seating face to confine the flow of air internally of the tubing and to prevent axial movement of the tubing in the direction of said flow of air and away from said seating face while the air is flowing through the interior of the tubing, manually inserting a mandrel into said piece of flexible tubing at said projecting portion thereof and through said projecting portion and said major portion of the tubing to a position against said seating face while the tubing is thus restrained against rupture and thus held in said position and pressed against said seating face and while the air is flowing through the interior of the tubing, and manually releasing the assembled tubing and mandrel and thereby effecting ejection of the tubing and mandrel assembly from said bore by the flow of air.

3. Apparatus for assembling flexible tubing upon a mandrel, said apparatus comprising a support, an elongate tubular member carried by said support and having a bore therethrough for permitting the introduction of a piece of flexible tubing of extensible material endwise into said bore at one end of the member to a seating position in said bore at the other end of the member so that the wall of the tubing extends axially along the interior of said bore in adjacent relation to the internal wall of said member in said bore and is restrained against rupture, a closure element sealingly united with said tubular member at said other end thereof and having an annular shoulder laterally of said bore presenting an annular seating face in said bore at said other end for seating against an end of the tubing, said closure element having a conduit in communication with said bore at said seating face for providing flow of air through the tubing disposed in said bore to facilitate inserting the mandrel into the tubing and to effect ejection of the assembled tubing and mandrel from within the tubular member.

4. Apparatus as defined in claim 3 in which said bore of said tubular member is of uniform diameter slightly greater than the outside diameter of said tubing, and in which said conduit of said closure element is in communication with said bore through said shoulder and said seating face.

5. Apparatus as defined in claim 3 in which said closure element is sealingly and detachably united with said tubular member at said other end thereof and has a central recess at said shoulder and said seating face in axial alignment with said bore of said member for receiving an end portion of said mandrel.

JOHN A. DORNER.

References Cited in the file of this patent

UNITED STATES PATENTS

| Number | Name | Date |
| --- | --- | --- |
| 284,050 | Nichols | Aug. 28, 1883 |
| 1,461,130 | Loughead | July 10, 1923 |
| 1,599,905 | Loughead | Sept. 14, 1926 |
| 1,608,206 | Freelander | Nov. 23, 1926 |
| 2,090,014 | Wiltse | Aug. 17, 1937 |
| 2,201,706 | Sukohl | May 21, 1940 |
| 2,293,426 | Coberly | Aug. 18, 1942 |
| 2,333,349 | Weatherhead | Nov. 2, 1943 |
| 2,347,003 | Searle | Apr. 18, 1944 |
| 2,359,532 | Searle | Oct. 3, 1944 |
| 2,361,026 | Greene | Oct. 24, 1944 |
| 2,366,359 | Searle | Jan. 2, 1945 |
| 2,432,701 | Van Orden | Dec. 16, 1947 |
| 2,450,727 | Haushalter | Oct. 5, 1948 |